(12) United States Patent
Vechtomova

(10) Patent No.: US 12,346,667 B2
(45) Date of Patent: Jul. 1, 2025

(54) AUTOENCODER-BASED LYRIC GENERATION

(71) Applicant: Olga Vechtomova, Baden (CA)

(72) Inventor: Olga Vechtomova, Baden (CA)

(*) Notice: Subject to any disclaimer, the term of this patent is extended or adjusted under 35 U.S.C. 154(b) by 344 days.

(21) Appl. No.: 17/952,817

(22) Filed: Sep. 26, 2022

(65) Prior Publication Data

US 2023/0104417 A1 Apr. 6, 2023

Related U.S. Application Data

(60) Provisional application No. 63/250,077, filed on Sep. 29, 2021.

(51) Int. Cl.
| | |
|---|---|
| *G06F 40/56* | (2020.01) |
| *G10H 1/00* | (2006.01) |
| *G10L 25/18* | (2013.01) |
| *G10L 25/30* | (2013.01) |

(52) U.S. Cl.
CPC .......... *G06F 40/56* (2020.01); *G10H 1/0008* (2013.01); *G10L 25/18* (2013.01); *G10L 25/30* (2013.01); *G10H 2210/031* (2013.01); *G10H 2250/311* (2013.01)

(58) Field of Classification Search
CPC ... G10L 13/033; G06F 16/638; G06F 16/686; G10H 7/00; G10H 2210/021; G10H 2210/101; G10H 2240/141; G11B 27/02
See application file for complete search history.

(56) References Cited

U.S. PATENT DOCUMENTS

| | | | | |
|---|---|---|---|---|
| 10,474,756 | B2 * | 11/2019 | Anisimovich | G06F 40/30 |
| 10,818,308 | B1 * | 10/2020 | Chu | G10L 15/26 |
| 12,165,655 | B1 * | 12/2024 | Sandrew | G10L 17/14 |
| 12,204,627 | B2 * | 1/2025 | Wexler | G06F 40/40 |
| 2006/0004669 | A1 * | 1/2006 | Ito | G06Q 30/00 705/59 |
| 2006/0271494 | A1 * | 11/2006 | Ito | G06F 21/10 705/59 |
| 2021/0158789 | A1 * | 5/2021 | Wu | G06N 3/08 |

(Continued)

FOREIGN PATENT DOCUMENTS

| | | | | |
|---|---|---|---|---|
| AU | 2004258523 A1 * | 2/2006 | | G06F 21/10 |
| CA | 2605641 A1 * | 11/2006 | | G06T 1/0071 |

(Continued)

OTHER PUBLICATIONS

Xingxing Zhang and Mirella Lapata, "Chinese poetry generation with recurrent neural networks", Proceedings of the 2014 Conference on Empirical Methods in Natural Language Processing (EMNLP), Oct. 2014, pp. 670-680, Association for Computational Linguistics, Doha, Qatar.

(Continued)

*Primary Examiner* — Mohammad K Islam

(57) ABSTRACT

Some embodiments of the present disclosure relate to generating novel lyrics lines conditioned on music audio. A bimodal neural network model may learn to generate lyric lines conditioned on a given short audio clip. The bimodal neural network model includes a spectrogram variational autoencoder and a text variational autoencoder. Output from the spectrogram variational autoencoder is used to influence output from text variational autoencoder.

18 Claims, 11 Drawing Sheets

(56) References Cited

U.S. PATENT DOCUMENTS

| | | | | |
|---|---|---|---|---|
| 2021/0201863 A1 * | 7/2021 | Bosch Vicente | ......... | G10H 1/36 |
| 2024/0127775 A1 * | 4/2024 | Vechtomova | ........... | G06F 40/40 |

FOREIGN PATENT DOCUMENTS

| | | | | | |
|---|---|---|---|---|---|
| CA | 2605646 | A1 | * | 11/2006 | ........... G06T 1/0071 |
| CA | 3132537 | A1 | * | 3/2023 | ............ G06F 40/56 |
| CN | 1525363 | A | * | 9/2004 | ........... G06F 16/686 |
| CN | 107430849 | B | * | 2/2021 | ............... G10H 1/00 |
| CN | 112580340 | A | * | 3/2021 | |
| CN | 114880516 | A | * | 8/2022 | ........... G06F 16/686 |
| CN | 115346503 | A | * | 11/2022 | ........... G06F 16/686 |
| CN | 115114474 | B | * | 10/2024 | ........... G06F 16/685 |
| JP | 2002502510 | A | * | 5/1998 | ........... G10L 13/033 |
| JP | 2004506947 | A | * | 8/2001 | ........... G10L 19/002 |
| JP | 2004013493 | A | * | 1/2004 | ........... G10L 19/002 |
| JP | 2004193843 | A | * | 7/2004 | ........... G10L 19/002 |
| JP | 2006244075 | A | * | 9/2006 | ........... G10L 19/002 |
| JP | 3990853 | B2 | * | 10/2007 | ............ G06F 21/10 |
| JP | 4353651 | B2 | * | 10/2009 | ............ G06F 21/10 |
| JP | 4456185 | B2 | * | 4/2010 | ........... G06T 1/0085 |
| JP | 5598056 | B2 | * | 10/2014 | ........... G10L 13/033 |
| KR | 100865247 | B1 | * | 7/2002 | ........... G10L 19/018 |
| TW | I394142 | B | * | 8/2009 | ........... G10L 13/033 |
| WO | WO-2014088036 | A1 | * | 6/2014 | ........... G10H 1/0066 |
| WO | WO-2023058173 | A1 | * | 4/2023 | ........... G10L 13/033 |
| WO | WO-2024097380 | A1 | * | 5/2024 | ........... G06F 16/685 |
| WO | WO-2024158853 | A1 | * | 8/2024 | ............. G06N 3/084 |
| WO | WO-2024220450 | A1 | * | 10/2024 | ............. G06F 3/012 |
| WO | WO-2024243183 | A2 | * | 11/2024 | ............. G06F 40/30 |

OTHER PUBLICATIONS

Aleksey Tikhonov and Ivan P. Yamshchikov, "Guess who? Multilingual approach for the automated generation of author-stylized poetry", arXiv preprint arXiv:1807.07147, Sep. 17, 2018.

Wen-Feng Cheng, Chao-Chung Wu, Ruihua Song, Jianlong Fu, Xing Xie and Jian-Yun Nie, "Image inspired poetry generation in Xiaolce", arXiv preprint arXiv:1808.03090, Aug. 9, 2018.

Brian Eno, "Generative music", http://www.inmotionmagazine.com/eno1.html, 1996.

Arne Eigenfeldt and Philippe Pasquier "Negotiated content: Generative soundscape composition by autonomous musical agents in coming together: Freesound" in ICCC, 2011, pp. 27-32.

Miles Thorogood, Philippe Pasquier, and Arne Eigenfeldt, "Audio metaphor: Audio information retrieval for soundscape composition", Proc. of the Sound and Music Computing Cong.(SMC), 2012, pp. 277-283.

* cited by examiner

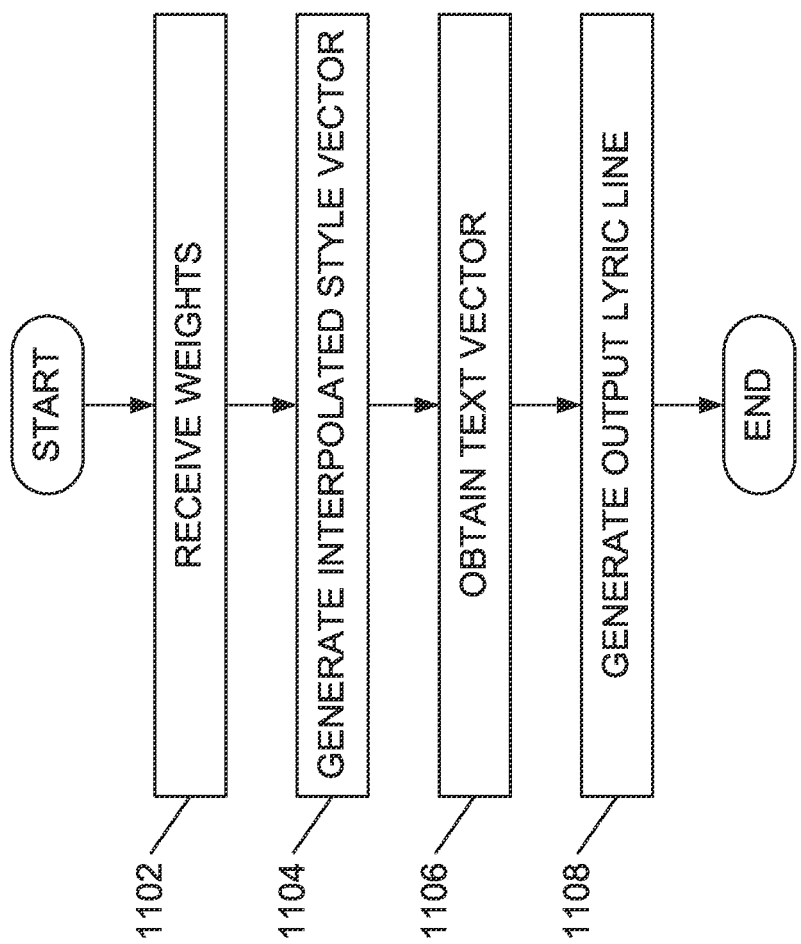

AUTOENCODER-BASED LYRIC GENERATION

CROSS REFERENCE TO RELATED APPLICATION

The present application claims a priority benefit to U.S. Provisional Patent Application Ser. No. 63/250,077, filed on Sep. 29, 2021, the contents of which application are hereby incorporated herein by reference.

TECHNICAL FIELD

The present disclosure relates, generally, to using artificial intelligence to generate lyrics and, in particular embodiments, to using an autoencoder-based approach to lyric generation.

BACKGROUND

Outputs of artificial intelligence models can serve as an inspiration for artists, writers and musicians when they create original artwork or compositions.

There exist a number of known approaches to poetry generation. Some approaches focus on such characteristics as rhyme and poetic meter (see Xingxing Zhang and Mirella Lapata, "Chinese poetry generation with recurrent neural networks," *Proceedings of the 2014 Conference on Empirical Methods in Natural Language Processing (EMNLP)*, pages 670-680, 2014). Other approaches focus on generating poetry in the style of a specific poet (see Aleksey Tikhonov and Ivan P Yamshchikov, "Guess who? Multilingual approach for the automated generation of author-stylized poetry," arXiv preprint arXiv:1807.07147, 2018.). In Wen-Feng Cheng, Chao-Chung Wu, Ruihua Song, Jianlong Fu, Xing Xie, and Jian-Yun Nie, "Image inspired poetry generation in xiaoice," arXiv preprint arXiv:1808.03090, 2018, the authors propose image-inspired poetry generation. The approach of using style embeddings in controlled text generation has been explored in generating text conditioned on sentiment and persona-conditioned responses in dialogue systems.

SUMMARY

Aspects of the present application relate to generating novel lyrics lines conditioned on music audio. A bimodal neural network model may learn to generate lyric lines conditioned on a given short audio clip. The bimodal neural network model includes a spectrogram variational autoencoder and a text variational autoencoder. Output from the spectrogram variational autoencoder is used to influence output from text variational autoencoder.

According to an aspect of the present disclosure, there is provided a method of generating lyrics. The method includes obtaining, from an encoding portion of a first autoencoder, a representation of a time-limited audio recording, sampling, from a second distribution, a text vector and generating an output lyric line by decoding a text decoder input vector that is based, at least in part, on the representation and the text vector. The decoding uses a decoding portion of a second autoencoder, wherein the second autoencoder is a latent variable model autoencoder. The decoding portion of the second autoencoder has been trained to generate reconstructed output lyric lines based, at least in part, on input that includes: a first latent vector from a latent space of the first autoencoder, the first autoencoder trained with spectrogram input of known musical works; and a second latent vector sampled from a distribution in a latent space of the second autoencoder, the second autoencoder trained with lyric input of the known musical works corresponding to the spectrogram input of known musical works. The distribution in the latent space of the second autoencoder is encoded lyric input corresponding to a spectrogram input encoded to lead to the first latent vector.

According to an aspect of the present disclosure, there is provided a method of constructing a machine learning model for generating lyric lines. The method includes receiving a plurality of known songs that include lyrics, dividing each song of the plurality of known songs into a plurality of intervals, training a first autoencoder to generate a reconstructed spectrogram from an input spectrogram derived from an interval among the plurality of intervals, wherein the training the first autoencoder causes generation of a first latent space including a plurality of first distributions, where each first distribution in the plurality of first distributions corresponds to an interval among the plurality of intervals and training a second variational autoencoder to generate a reconstructed lyric line from an input lyric line derived from an interval among the plurality of intervals, wherein the training the second variational autoencoder causes generation of a second latent space including a plurality of second distributions, where each second distribution in the plurality of second distributions corresponds to an interval among the plurality of intervals. During the training the second variational autoencoder, a decoder portion of the second variational autoencoder is configured to generate the reconstructed lyric line based on input that includes a spectral vector selected from a first distribution in the first latent space, the first distribution corresponding to a given interval, and a text vector from selected from a second distribution in the second latent space, the second distribution corresponding to the given interval.

According to an aspect of the present disclosure, there is provided a method of generating lyrics. The method including obtaining a spectrogram, where the spectrogram is representative of a time-limited audio recording, encoding the spectrogram to, thereby, produce a first distribution, the encoding using an encoding portion of a first trained variational autoencoder, sampling, from the first distribution, an inference spectrogram latent code, generating, by providing the inference spectrogram latent code as input to a trained Generative Adversarial Network, an inference text latent code and generating an output lyric line by decoding a text decoder input vector that is based, at least in part, on the inference spectrogram latent code and the inference text latent code. The decoding uses a decoding portion of a variational autoencoder. The variational autoencoder has been trained to generate reconstructed output lyric lines. Training the variational autoencoder includes encoding a training spectrogram to, thereby, produce a training distribution, the encoding using the encoding portion of the first variational autoencoder, sampling, from the training distribution, a training spectrogram latent code, encoding a training input to, thereby, obtain a second distribution, the encoding using an encoding portion of the variational autoencoder, sampling, from the second distribution, a training text latent code and providing, as input to the decoder portion of the variational autoencoder, a training text decoder input vector that is based, at least in part, on the training spectrogram latent code and the training text latent code. The training input includes a lyric line corresponding to the training spectrogram and the training spectrogram latent code.

According to an aspect of the present disclosure, there is provided a method of generating lyrics. The method includes obtaining a spectrogram, where the spectrogram is representative of a time-limited audio recording, encoding the spectrogram to, thereby, produce a first distribution, the encoding using an encoding portion of a first trained variational autoencoder, sampling, from the first distribution, an inference spectrogram latent vector, sampling, from a second distribution, an inference text latent vector, wherein a location, in a text latent space of a second trained conditional variational autoencoder, of the second distribution corresponds to a location, in a latent space of the first trained variational autoencoder, of the first distribution and generating an output lyric line by decoding a text decoder input vector that is based, at least in part, on the inference spectrogram latent vector and the inference text latent vector. The decoding uses a decoding portion of the conditional variational autoencoder. The conditional variational autoencoder has been trained to generate reconstructed output lyric lines. Training the conditional variational autoencoder includes encoding a training spectrogram to, thereby, produce a training distribution, the encoding using the encoding portion of the first variational autoencoder, sampling, from the training distribution, a training spectrogram latent vector, encoding a training input to, thereby, obtain a second distribution, the encoding using an encoding portion of the conditional variational autoencoder, sampling, from the second distribution, a training text latent vector and providing, as input to the decoder portion of the conditional variational autoencoder, a training text decoder input vector that is based, at least in part, on the training spectrogram latent vector and the training text latent vector. The training input includes a lyric line corresponding to the training spectrogram and the training spectrogram latent vector.

According to an aspect of the present disclosure, there is provided a method of training a machine learning model for generating lyric lines. The method includes receiving a plurality of known songs that include lyrics, dividing each song of the plurality of known songs into a plurality of intervals, training a first autoencoder to generate a reconstructed spectrogram from an input spectrogram derived from an interval among the plurality of intervals, wherein the training the first autoencoder causes generation of a first latent space including a plurality of first distributions, where each first distribution in the plurality of first distributions corresponds to an interval among the plurality of intervals and training a second autoencoder to generate a reconstructed lyric line from an input lyric line derived from a particular interval among the plurality of intervals in combination with a first latent vector sampled from a particular first distribution in the plurality of first distributions, wherein the particular first distribution corresponds to the particular interval and wherein the training the second autoencoder causes generation of a second latent space including a plurality of second distributions, where each second distribution in the plurality of second distributions corresponds to an interval among the plurality of intervals. During the training the second variational autoencoder, a decoder portion of the second variational autoencoder is configured to generate the reconstructed lyric line based on input that includes the first latent vector and a second latent vector selected from a second distribution in the second latent space, the second distribution corresponding to the particular interval.

According to an aspect of the present disclosure, there is provided a method lyric generation. The method includes obtaining a plurality of style vectors, obtaining a plurality of weights, each weight among the plurality of weights corresponding to a style vector among the plurality of style vectors, generating, by weighting each style vector by the corresponding weight, an interpolated style vector, sampling a text vector from a prior distribution of a trained text variational autoencoder, the trained text variational autoencoder having an encoder portion and a decoder portion and generating an output lyric line by decoding, using the decoder portion of the trained text variational autoencoder, a text decoder input vector that is based, at least in part, on the interpolated style vector and the text vector.

BRIEF DESCRIPTION OF THE DRAWINGS

For a more complete understanding of the present embodiments, and the advantages thereof, reference is now made, by way of example, to the following descriptions taken in conjunction with the accompanying drawings, in which:

FIG. 11 illustrates example steps in a lyric generation method using the fifth approach illustrated in FIGS. 9 and 10, in accordance with aspects of the present application.

DETAILED DESCRIPTION OF ILLUSTRATIVE EMBODIMENTS

Figure 1:
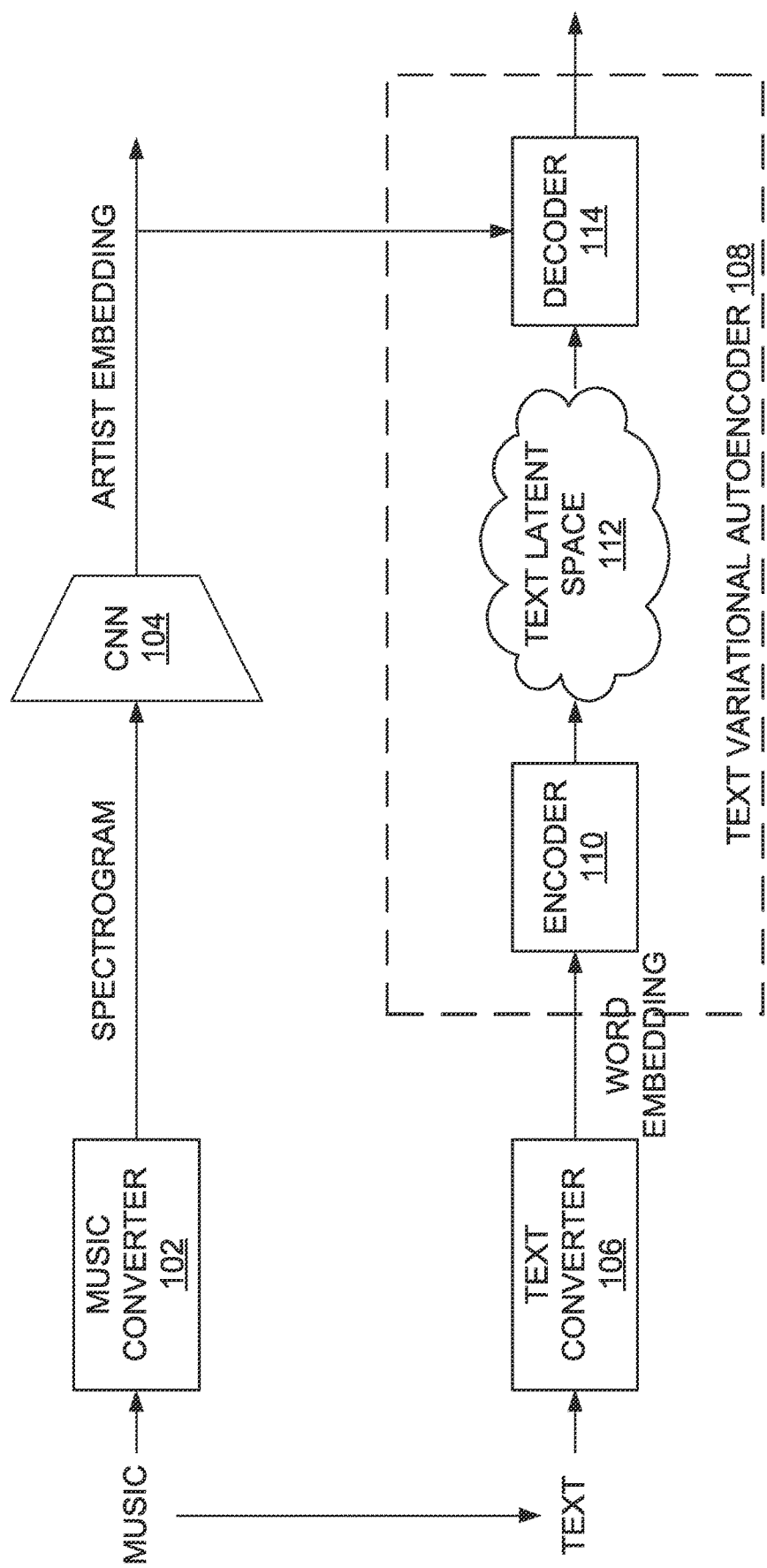
FIG. 1 illustrates, in a block diagram, a first approach to lyric generation in accordance with aspects of the present application.

For illustrative purposes, specific example embodiments will now be explained in greater detail in conjunction with the figures.

The embodiments set forth herein represent information sufficient to practice the claimed subject matter and illustrate ways of practicing such subject matter. Upon reading the following description in light of the accompanying figures, those of skill in the art will understand the concepts of the claimed subject matter and will recognize applications of these concepts not particularly addressed herein. It should be understood that these concepts and applications fall within the scope of the disclosure and the accompanying claims.

Moreover, it will be appreciated that any module, component, or device disclosed herein that executes instructions may include, or otherwise have access to, a non-transitory computer/processor readable storage medium or media for storage of information, such as computer/processor readable instructions, data structures, program modules and/or other data. A non-exhaustive list of examples of non-transitory computer/processor readable storage media includes magnetic cassettes, magnetic tape, magnetic disk storage or other magnetic storage devices, optical disks such as compact disc read-only memory (CD-ROM), digital video discs or digital versatile discs (i.e., DVDs), Blu-ray Disc™, or other optical storage, volatile and non-volatile, removable and non-removable media implemented in any method or technology, random-access memory (RAM), read-only memory (ROM), electrically erasable programmable read-only memory (EEPROM), flash memory or other memory technology. Any such non-transitory computer/processor storage media may be part of a device or accessible or connectable thereto. Computer/processor readable/executable instructions to implement an application or module described herein may be stored or otherwise held by such non-transitory computer/processor readable storage media. Aspects of the present application may be understood to employ processors to carry out various tasks. It is known that graphics processing units (GPUs) are particular well-suited to many of the tasks disclosed herein. However, in implementation, various computation resources other than GPUs may also be employed, such as central processing units (CPUs).

Aspects of the present application relate to generating lyric lines based on a music piece provided by a user. A system that embodies aspects of the present application may suggest, to the user, novel lyric lines that reflect the style and the emotions present in the provided music piece. Responsive to an artist playing a live music piece, or providing a pre-recorded audio clip of a music piece, the system may generate lyric lines that match a detected style of the music piece and have an emotional impact matching the music piece. The user may be shown the lyric lines as the lyric lines are generated in real time. The lyric lines may be seen to suggest phrases and themes that the artist can use, not only to inspire their own lyric composition, but can also use to guide their musical expressions and instrumentation as the artist plays the music piece. The generated lines are not intended to be the complete song lyrics. Instead, the generated lines are intended to act as snippets of ideas and expressions that may inspire the artist's own creativity.

In overview, aspects of a first approach of the present application relate to using generative models to assist songwriters and musicians in the task of writing song lyrics. In contrast to systems that generate lyrics for an entire song, aspects of the present application relate to generating suggestions for lyrics lines in the style of a specified artist. It is expected that unusual and creative arrangements of words in the suggested lyric lines will inspire the songwriter to create original lyrics. Conditioning the generation on the style of a specific artist is done in order to maintain stylistic consistency of the suggestions. Such use of generative models is intended to augment the natural creative process when an artist may be inspired to write a song based on something they have read or heard.

FIG. 1 illustrates, in a block diagram, a first approach to lyric generation. The first approach includes a converter 102 configured to receive a 10-second clip of an input song and convert the clip into a mel spectrogram. A spectrogram may be obtained, by the converter 102, by computing a Fast Fourier Transform (FFT) on overlapping windowed segments of the input clip. The known mel scale is a perceptual scale of pitches judged by listeners to be equal in distance from one another. Accordingly, a "mel spectrogram" is a spectrogram wherein the frequencies are converted to the mel scale.

The first approach further includes a convolutional neural network (CNN) 104 that is trained to receive the mel spectrogram and output an artist embedding. The term artist embedding may be used to refer to a vector representative of a particular artist. That is, in a training phase, the CNN 104 has been provided with a large number of songs by a particular artist. Over the course of the training phase, the CNN 104 improves at the task of outputting an artist embedding associated with the artist of each input song clip.

The first approach also includes a text variational autoencoder 108. The text variational autoencoder 108 includes a text encoder 110, a text latent space 112 and a text decoder 114.

In typical operation of the text autoencoder 108, the text encoder 110 receives, from a text converter 106, an input text vector. The input text vector may be understood to exist in a so-called prior distribution of input text vectors. The text converter 106 receives text and converts the text to vector form. The text converter 106 works as follows: 1) tokenize the text (i.e., split the text into words); 2) map each word into a vocabulary index; and 3) map each vocabulary index to a word embedding.

The text encoder 110 encodes the input text embedding to produce a posterior distribution in the text latent space 112. The posterior distribution may be represented as a vector of means and standard deviations. A sample may then be obtained from the posterior distribution in the text latent space 112. The sample may be used as a text decoder input and provided to the decoder 114. An output text vector at the output of the decoder 114 is expected, with sufficient training, to approach the input text vector. The output text vector may be converted to a lyric line in a converter (not shown). The output of the decoder 114 at each time step (i.e., for every word in a sentence) is a probability distribution over V (the vocabulary of all words in our dictionary). After selecting a vocabulary index from probability distribution, e.g., by using argmax (e.g., the converter may select the word with a highest predicted probability), the converter carries out a look-up of an actual word using the vocabulary index.

During training, providing, to the decoder 114, a text decoder input that is a sample obtained from the posterior distribution in the text latent space 112 is typical of a training phase for a known text variational autoencoder. The text variational autoencoder 108 differs from the known text variational autoencoder in that the decoder 114 receives additional input. In the training phase for the text variational autoencoder 108 of FIG. 1, a text decoder input is formed from a sample obtained from the posterior distribution in the text latent space 112 along with an artist embedding at the output of the CNN 104. When the text input to the text converter 106 corresponds to a song by a particular artist, the training phase causes the decoder 114 to learn to produce output lyrics in a manner that is consistent with the particular artist.

An inference phase dispenses with the music converter 102, the encoder 110 and the CNN 104 and begins with an artist embedding that may be based on a plurality of weights provided by the user. The user may, for example, indicate a weight of 1 for a particular artist embedding and 0 for the rest. Alternatively, the user may indicate a plurality of weights summing to 1, in which case an interpolated artist embedding may be formed. A text sample is obtained from the prior text distribution (e.g., a standard normal distribution) and concatenated with the interpolated artist embedding to form a decoder input vector. The decoder input vector is then decoded by the decoder 114, thereby leading to a lyric line.

Figure 2:
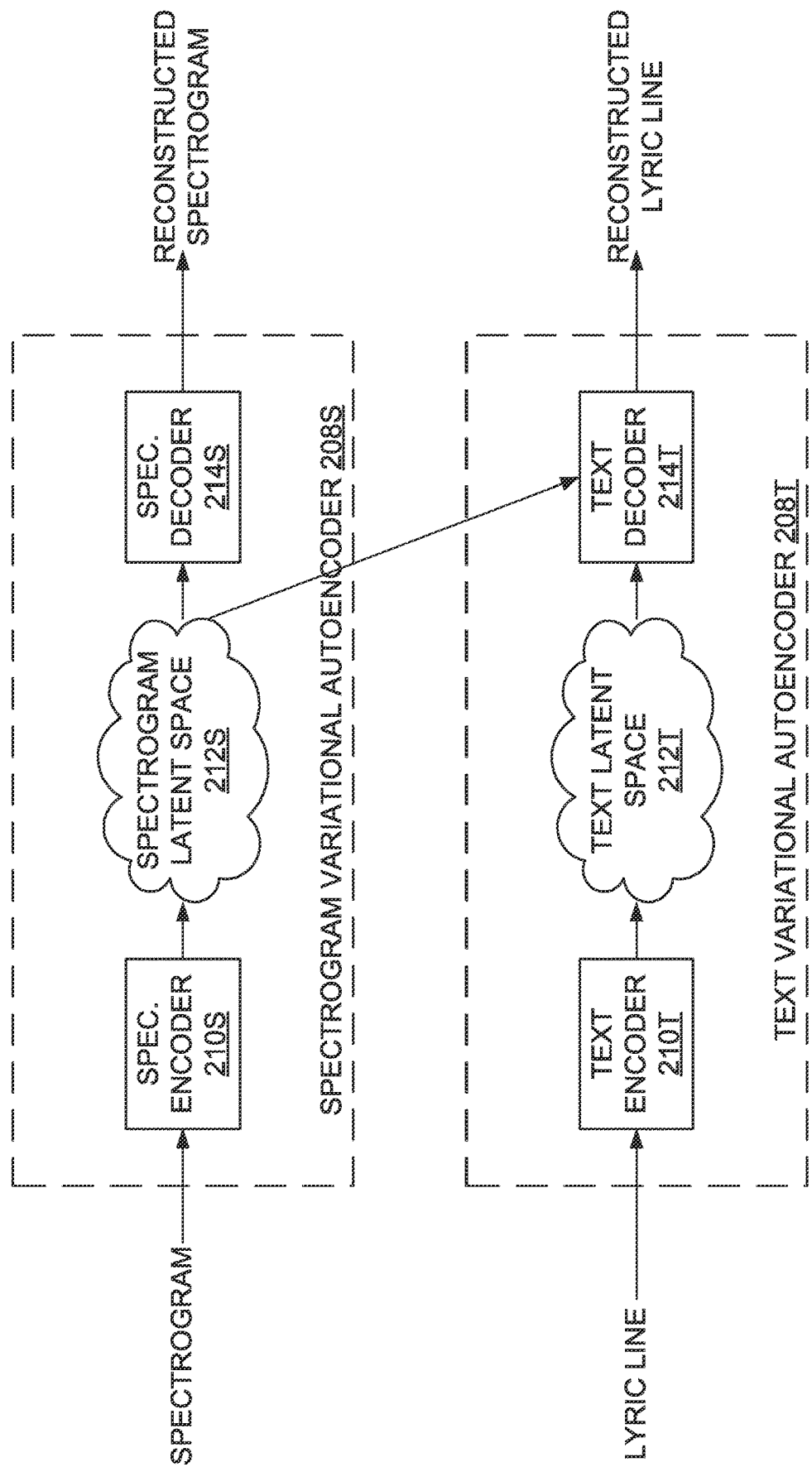
FIG. 2 illustrates, in a block diagram, a second approach to lyric generation in accordance with aspects of the present application.

FIG. 2 illustrates, in a block diagram, a second approach to lyric generation, in accordance with aspects of the present application.

The second approach includes a spectrogram variational autoencoder 208S and a text variational autoencoder 208T. Notably, FIG. 2 does not show equivalent structures to the music converter 102 and the text converter 106 of FIG. 1. However, similar structures should be understood to be present as part of the second approach for use in converting music clips into their corresponding spectrograms and text.

As is typical of a generic variational autoencoder, the spectrogram variational autoencoder 208S includes a spectrogram encoder 210S, a spectrogram latent space 212S and a spectrogram decoder 214S. In aspects of the present application, the spectrogram encoder 210S may be implemented as a convolutional neural network. In aspects of the present application, the spectrogram decoder 214S may be implemented as a convolutional neural network.

In a typical training phase of the spectrogram variational autoencoder 208S, the spectrogram encoder 210S receives an input spectrogram. The structure similar to the music converter 102 of FIG. 1 may be understood to have received a song that includes lyrics. It is expected that the structure has divided the song into a plurality of intervals. The input spectrogram corresponds to an audio signal in a given interval. Lyrics for the given interval are sent toward the text variational autoencoder 208T. The spectrogram encoder 210S encodes the input spectrogram to produce a posterior distribution in the spectrogram latent space 212S. The posterior distribution may be represented as a vector of means and standard deviations. A sample may then be obtained from the posterior distribution corresponding to a given interval in the spectrogram latent space 212S. The sample may be used as a spectrogram decoder input and provided to the spectrogram decoder 214S. An estimated spectrogram at the output of the spectrogram decoder 214S is expected, with sufficient training, to approach the input spectrogram for the given interval.

The training of the spectrogram variational autoencoder 208S may cause the population of the spectrogram latent space 212S with a plurality of spectrogram posterior distributions, where each spectrogram posterior distribution in the plurality of spectrogram posterior distributions corresponds to an interval among the plurality of intervals.

The text variational autoencoder 208T of FIG. 2 includes a text encoder 210T, a text latent space 212T and a text decoder 214T. In aspects of the present application, the text encoder 210T may be implemented as a long short term memory network. In aspects of the present application, the text decoder 214T may be implemented as a long short term memory network.

In a training phase for the text variational autoencoder 208T of FIG. 2, the text encoder 110 receives an input text vector. The input text vector may be understood to correspond to an input lyric line derived from an interval and may exist in the prior distribution of input text vectors. The text encoder 210T encodes the input text vector to produce a posterior distribution in the text latent space 212T. The posterior distribution may be represented as a vector of means and standard deviations. A text vector may then be sampled from the posterior distribution for a particular interval in the text latent space 212T. The text vector may be concatenated with a spectrogram vector that has been sampled from the posterior distribution for the particular interval in the spectrogram latent space 212S. The text vector concatenated with the spectrogram vector may be used as a text decoder input and provided to the text decoder 214T. Reconstructed lyric lines output from a converter (not shown), based on probability distributions at the output of the text decoder 214T, are expected, with sufficient training, to approach the input lyric lines. The output probability distributions may be used, by the converter (not shown) to select vocabulary indices and look-up actual words using the vocabulary indices, to generate the reconstructed lyric lines.

The training of the text variational autoencoder 208T may cause the population of the text latent space 212T with a plurality of text posterior distributions, where each text posterior distribution in the plurality of text posterior distributions corresponds to an interval among the plurality of intervals.

Figure 3:
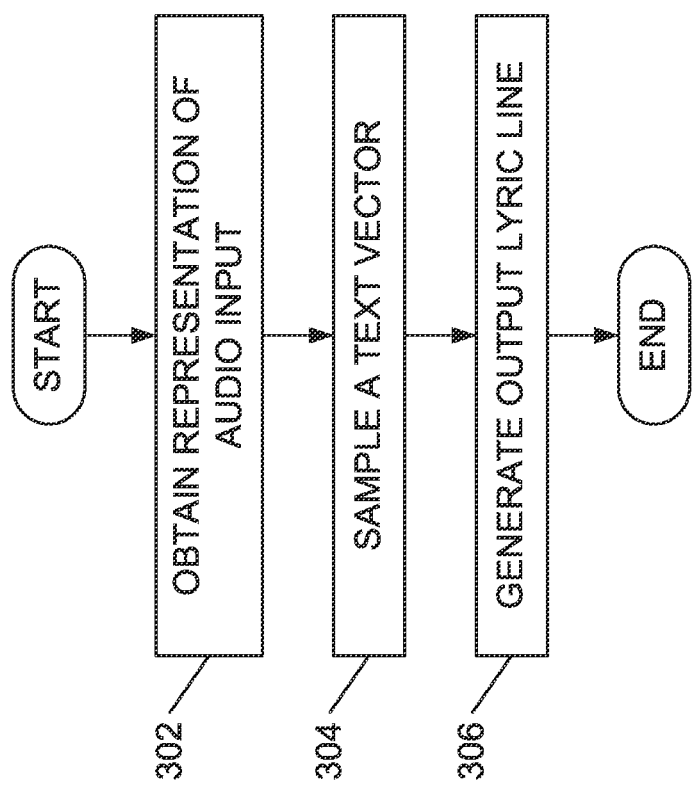
FIG. 3 illustrates example steps in a lyric generation method using the second approach illustrated in FIG. 2, in accordance with aspects of the present application.

FIG. 3 illustrates example steps of operation of the second lyric generation approach, of FIG. 2, in an inference phase. In overview, the second lyric generation approach involves receiving a time-limited audio recording and, responsively, generating lyrics. Initially, the spectrogram encoder 210S may obtain (step 302) a representation of the time-limited audio recording.

The term "representation" may be understood, in some aspects of the present application, to refer to a posterior distribution. In some other aspects of the present application, the spectrogram autoencoder 208S (according to FIG. 2) need not, necessarily, be variational. In a case wherein the spectrogram autoencoder is not variational, the output of the spectrogram encoder 210S may be a vector, rather than a distribution. Furthermore, the spectrogram autoencoder may not even process spectrograms. Instead, other representations of audio may be processed, such as raw waveforms.

The text variational autoencoder 208T (according to FIG. 2) may sample (step 304), from the prior text distribution, a text vector.

The text decoder 214T may then generate (step 306), with the help of a converter, an output lyric line by decoding a text decoder input vector. The text decoder input vector may be based, at least in part, on the representation obtained in step 302 and the text vector sampled in step 304. Recall that the output of the text decoder 214T is, generally, probability distributions. The probability distributions may be converted, by an output converter (not shown) into lyrics lines that may be understood by a user. For simplicity, it may be assumed that an output converter is associated with the text decoder 214T for lyric line output purposes.

In some aspects of the present application, the text autoencoder 208T need not, necessarily, be variational. However, the text autoencoder 208T is expected to fall into a category of autoencoders known as latent variable model autoencoders. Autoencoders in this category include, but are not limited to, a Wasserstein autoencoder and an Adversarially Regularized autoencoder.

Figure 4:
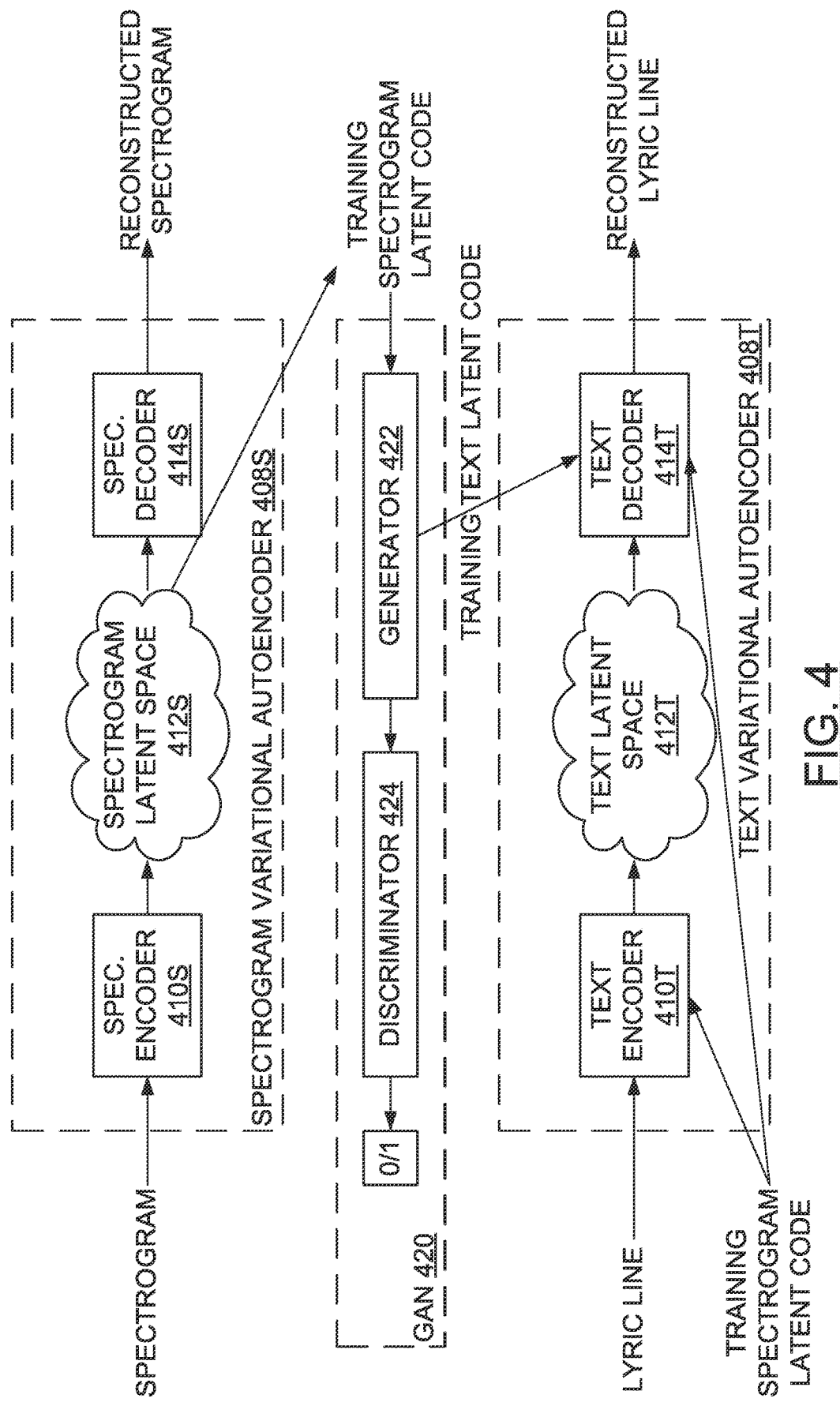
FIG. 4 illustrates, as a block diagram, a training phase of a third approach to lyric generation in accordance with aspects of the present application.

FIG. 4 illustrates, in a block diagram, a third approach to lyric generation, in accordance with aspects of the present application.

The third approach includes a spectrogram variational autoencoder 408S and a text variational autoencoder 408T. Notably, FIG. 4 does not show equivalent structures to the music converter 102 and the text converter 106 of FIG. 1. However, similar structures should be understood to be present as part of the third approach for use in converting music clips into their corresponding spectrograms and text.

In common with the spectrogram variational autoencoder 208S of FIG. 2, the spectrogram variational autoencoder 408S of FIG. 4 includes a spectrogram encoder 410S, a spectrogram latent space 412S and a spectrogram decoder 414S. In aspects of the present application, the spectrogram encoder 410S may be implemented as a convolutional neural network. In aspects of the present application, the spectrogram decoder 414S may be implemented as a convolutional neural network.

A training phase for the spectrogram variational autoencoder 408S of FIG. 4 may proceed in a manner consistent with the training phase, described hereinbefore, for the spectrogram variational autoencoder 208S of FIG. 2.

In common with the text variational autoencoder 208T of FIG. 2, the text variational autoencoder 408T of FIG. 4 includes a text encoder 410T, a text latent space 412T and a text decoder 414T. In aspects of the present application, the text encoder 410T may be implemented as a long short term memory network. In aspects of the present application, the text decoder 414T may be implemented as a long short term memory network.

The third approach of FIG. 4 differs from the second approach of FIG. 2 in that the third approach aims to align the text latent space 412T with the spectrogram latent space 412S. To achieve this aim, the third approach of FIG. 4 includes Generative Adversarial Network (GAN) 420. As is conventional, the GAN 420 includes a generator network 422 and a discriminator network 424.

A training phase for the text variational autoencoder 408T may involve encoding, at the spectrogram encoder 410S, a training spectrogram to, thereby, produce a training spectrogram distribution. The spectrogram variational autoencoder 408S may then sample, from the training spectrogram distribution, a training spectrogram latent code.

The training phase for the text variational autoencoder 408T may further involve encoding, at the text encoder 410T, a training input to, thereby, obtain a training text distribution. In aspects of the present application, the training input includes a lyric line corresponding to the training spectrogram and the training spectrogram latent code. Subsequently, the text variational autoencoder 408T may sample, from the training text distribution, a training text latent code. A training text decoder input vector may then be decoded by the text decoder 414T, thereby leading to a lyric line. The training text decoder input vector may be based, at least in part, on the training spectrogram latent code and the training text latent code.

Subsequent to the training of the spectrogram variational autoencoder 408S and the text variational autoencoder 408T, training of the GAN 420 may commence.

Preparing to train the GAN 420 includes providing an input spectrogram, $x^{(s)}$, to the spectrogram variational autoencoder 408S to obtain a spectrogram posterior distribution. The training spectrogram latent code, $z^{(s)}=\mu^{(s)}+\tau(\epsilon \cdot \sigma^{(s)})$, may then be obtained by sampling from the spectrogram posterior distribution. Here, $\mu^{(s)}$ denotes the mean predicted by the trained spectrogram variational autoencoder 408S and $\sigma^{(s)}$ denotes the standard deviation predicted by the trained spectrogram variational autoencoder 408S. $\epsilon \sim \mathcal{N}(0,1)$ is a random normal noise and $\tau$ is a sampling temperature. Preparing to train the GAN 420 also includes obtaining a training text latent code, $z^{(t)}=\mu^{(t)}+\tau(\epsilon \cdot \sigma^{(t)})$, by providing an input lyric line, $x^{(t)}$, corresponding to the input spectrogram, $x^{(s)}$, to the text variational autoencoder 408T.

Training the GAN 420 involves passing training spectrogram latent code, $z^{(s)}$ through the generator network 422. The output, $\hat{z}^{(t)}$, of the generator network 422 may be called a predicted text latent code.

A so-called negative sample, $\hat{z}$, may be formed by concatenating the predicted text latent code, $\hat{z}^{(t)}$, with the training spectrogram latent code, $z^{(s)}$.

A so-called positive sample, z, may be formed by concatenating the training text latent code, $z^{(t)}$, with the training spectrogram latent code, $z^{(s)}$.

Upon receipt of the negative sample and the positive sample, the discriminator network 424 attempts to distinguish between the two inputs. This adversarial training regime may be shown to incentivize the GAN 420 to match $\hat{z}^{(t)}$ as closely as possible to $z^{(t)}$.

It is notable that, on the basis that the text encoder 410T receives input that includes the training spectrogram latent code, the text variational autoencoder 408T may be called a "conditional" variational autoencoder. It is notable that, according to aspects of the present application, the text variational autoencoder 408T need not be implemented in a conditional manner.

Figure 5:
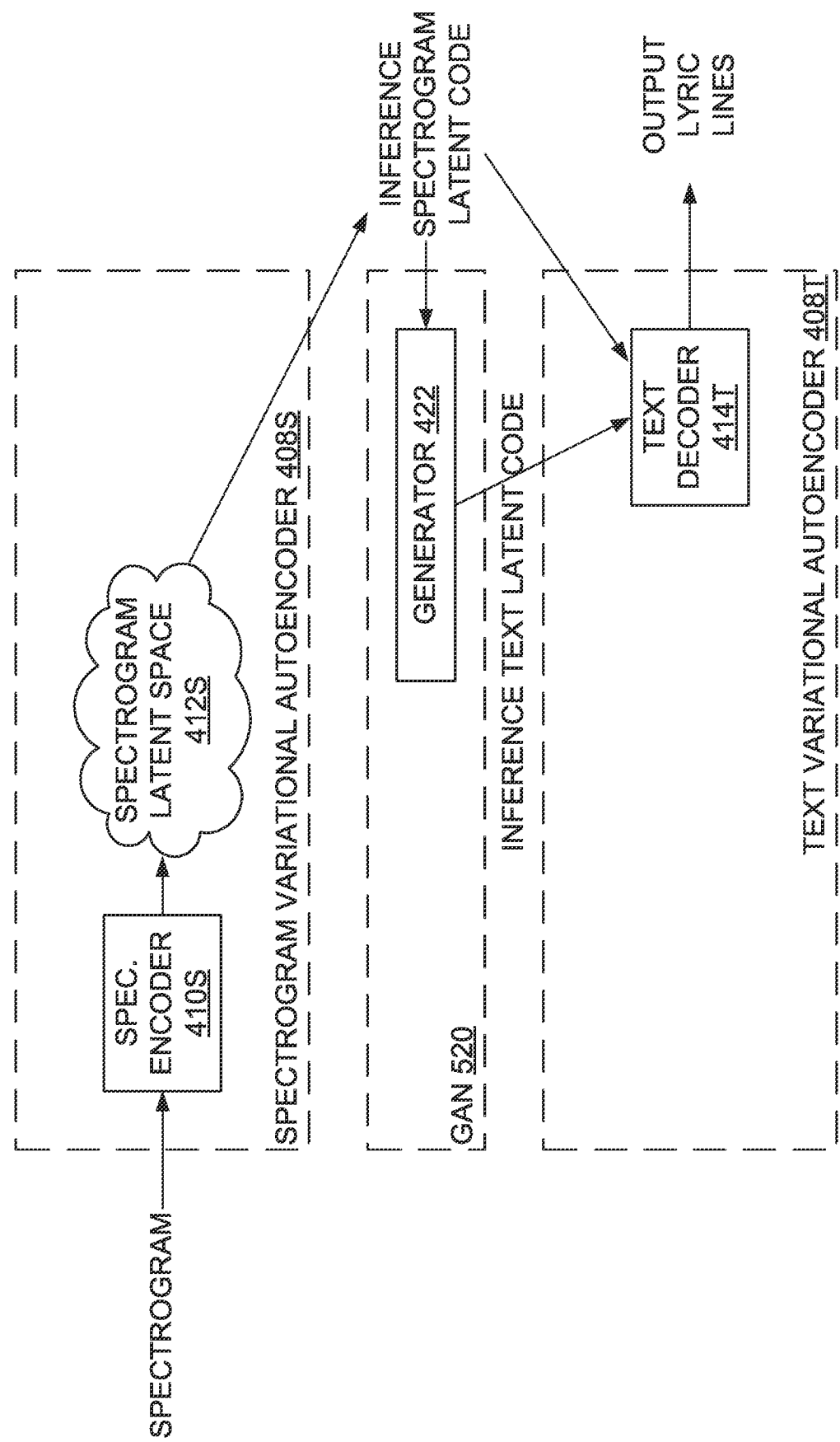
FIG. 5 illustrates, as a block diagram, an inference phase of the third approach of FIG. 4, in accordance with aspects of the present application.
Figure 6:
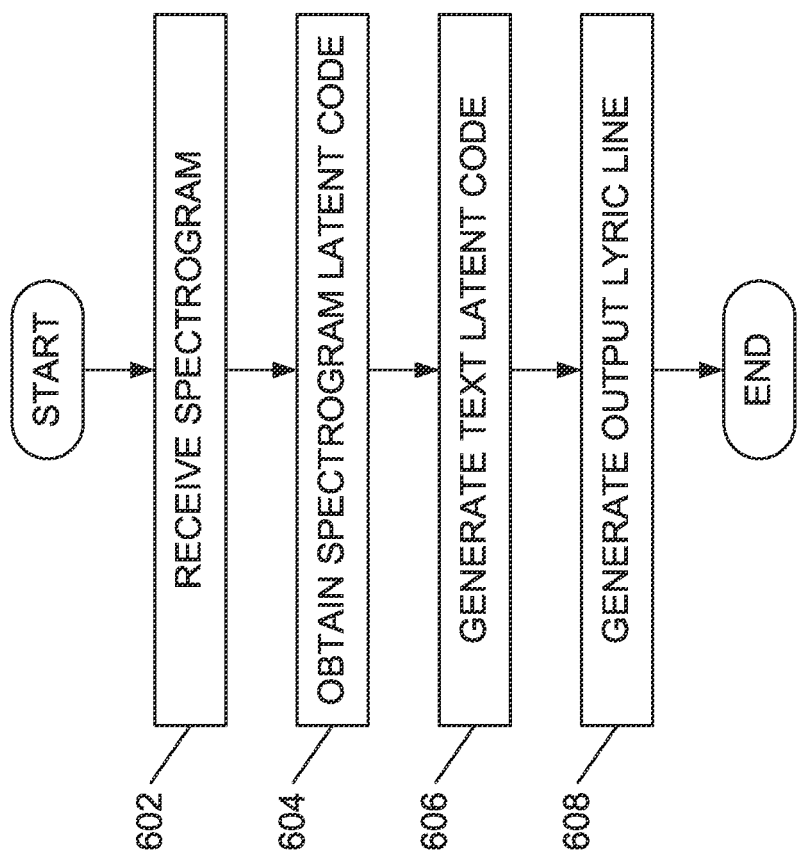
FIG. 6 illustrates example steps in a lyric generation method using the third approach illustrated in FIG. 5, in accordance with aspects of the present application.

At inference time, the text encoder 410T of the text variational autoencoder 408T is no longer needed. The third lyric generation approach is illustrated, in FIG. 5, in an inference phase. FIG. 6 illustrates example steps of operation of the third lyric generation approach as illustrated, in FIG. 5, in the inference phase.

A spectrogram that is received (step 602) at the spectrogram encoder 410, is used to obtain (step 604) an inference spectrogram latent code, $z^{(s)}$. The inference spectrogram latent code, $z^{(s)}$, is then received at the generator network 422 of the GAN 420. The generator network 422 generates (step 606), on the basis of the inference spectrogram latent code, $z^{(s)}$, an inference text latent code, $z^{(t)}$. The text decoder 414T receives an input vector and, on the basis of the input vector, the text decoder 414T generates (step 608) an output lyric line. The input vector may be formed by concatenating the inference text latent code, $z^{(t)}$, with the inference spectrogram latent code, $z^{(s)}$.

Notably, the inference method, example steps of which are illustrated in FIG. 6, is stochastic, due to the inference spectrogram latent code, $z^{(s)}$, being sampled from the spectrogram posterior distribution in the trained spectrogram latent space 412S. Such sampling allows for generation of diverse lyric lines for the same input spectrogram.

Figure 7:
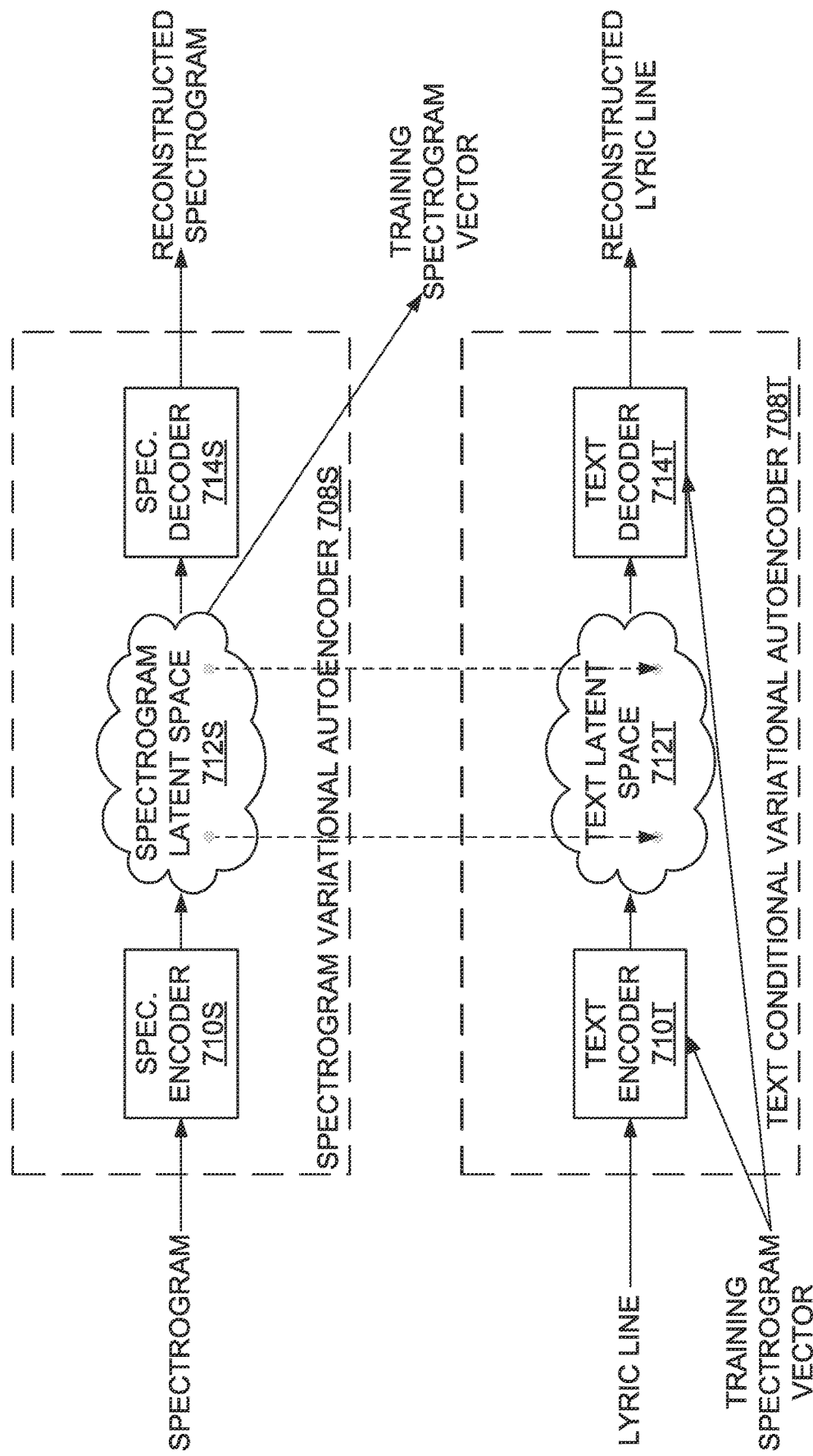
FIG. 7 illustrates, in a block diagram, a fourth approach to lyric generation, in accordance with aspects of the present application.

FIG. 7 illustrates, in a block diagram, a fourth approach to lyric generation, in accordance with aspects of the present application.

The fourth approach includes a spectrogram variational autoencoder 708S and a text conditional variational autoencoder 708T. Notably, FIG. 7 does not show equivalent structures to the music converter 102 and the text converter 106 of FIG. 1. However, similar structures should be understood to be present as part of the third approach for use in converting music clips into their corresponding spectrograms and text.

In common with the spectrogram variational autoencoder 208S of FIG. 2, the spectrogram variational autoencoder 708S of FIG. 7 includes a spectrogram encoder 710S, a spectrogram latent space 712S and a spectrogram decoder 714S. In aspects of the present application, the spectrogram encoder 710S may be implemented as a convolutional neural network. In aspects of the present application, the spectrogram decoder 714S may be implemented as a convolutional neural network.

A training phase for the spectrogram variational autoencoder 708S of FIG. 7 may proceed in a manner consistent with the training phase, described hereinbefore, for the spectrogram variational autoencoder 208S of FIG. 2.

In common with the text variational autoencoder 208T of FIG. 2, the text conditional variational autoencoder 708T of FIG. 7 includes a text encoder 710T, a text latent space 712T and a text decoder 714T. In aspects of the present application, the text encoder 710T may be implemented as a long short term memory network. In aspects of the present application, the text decoder 714T may be implemented as a long short term memory network.

The fourth approach aims to induce the text conditional variational autoencoder 708T to learn the same latent space topology as the spectrogram variational autoencoder 708S. This would mean that data points that are close in the spectrogram latent space 712S are expected to be close in the text latent space 712T. More concretely, if two audio clips are encoded, by the spectrogram encoder 710S, to result in distributions in neighboring regions of the spectrogram latent space 712S, their corresponding lyric lines should be encoded, by the text encoder 710T, to result in distributions in neighboring regions in the text latent space 712T.

In a training phase for the fourth approach, instead of using one prior (standard normal) text distribution to regularize every text posterior distribution, the posterior distribution of the spectrogram variational autoencoder 708S may be used as the prior distribution for any given input spectrogram.

More formally, let the input spectrogram be $x^{(s)}$ and let the corresponding input lyric line be $x^{(t)}$. The posterior distribution for the spectrogram in the spectrogram variational autoencoder 708S is $q_\phi^{(s)}(z^{(s)}|x^{(s)})$, and the posterior distribution for the lyric line in the text conditional variational autoencoder 708T is $q_\phi^{(t)}(z^{(t)}|x^{(t)}, z^{(s)})$.

A Kullback-Leibler (KL) term of a loss for the text conditional variational autoencoder 708T may be determined between the posterior distribution for the lyric line and a prior distribution. The prior distribution may be set to be the posterior distribution of its corresponding spectrogram in the spectrogram variational autoencoder 708S.

The training phase for the text conditional variational autoencoder 708T, may involve encoding, at the text encoder 710T, a training input to, thereby, obtain a training text distribution, $q_\phi^{(t)}(z^{(t)}|x^{(t)}, z^{(s)})$. In aspects of the present application, the training input includes a lyric line corresponding to a training spectrogram and a training spectrogram vector. Subsequently, the text conditional variational autoencoder 708T may sample, from the training text distribution, a training text vector. A training text decoder input vector may then be decoded by the text decoder 714T, thereby leading to a lyric line. The training text decoder input vector may be based, at least in part, on the training spectrogram vector and the training text vector.

Figure 8:
FIG. 8 illustrates example steps in a lyric generation method using the fourth approach illustrated in FIG. 7, in accordance with aspects of the present application.

FIG. 8 illustrates example steps in a lyric generation method using the fourth approach illustrated in FIG. 7, in accordance with aspects of the present application.

In an inference phase, initially, the spectrogram encoder 710S may encode an input spectrogram to obtain an inference spectrogram distribution. The spectrogram variational autoencoder 708S may obtain (step 802) an inference spectrogram vector. The obtaining (step 802) of the inference spectrogram vector may involve sampling from the inference spectrogram distribution.

The text conditional variational autoencoder 708T may sample (step 804), from a text distribution in the text latent space 712T, a text vector. More particularly, the text conditional variational autoencoder 708T may first select the text distribution on the basis that a location, in the text latent space 712T, of the text distribution corresponds to a location, in the spectrogram latent space 712S, of the inference spectrogram distribution obtained by encoding the input spectrogram.

The text decoder 714T may then generate (step 806) an output lyric line by decoding a text decoder input vector. The text decoder input vector may be based, at least in part, on the inference spectrogram vector obtained in step 802 and the text vector sampled in step 804.

In contrast to the second, third and fourth approaches outlined hereinbefore, a fifth approach to the task of lyric generation involves receipt of music from a user during model training time, but not during inference.

Figure 9:
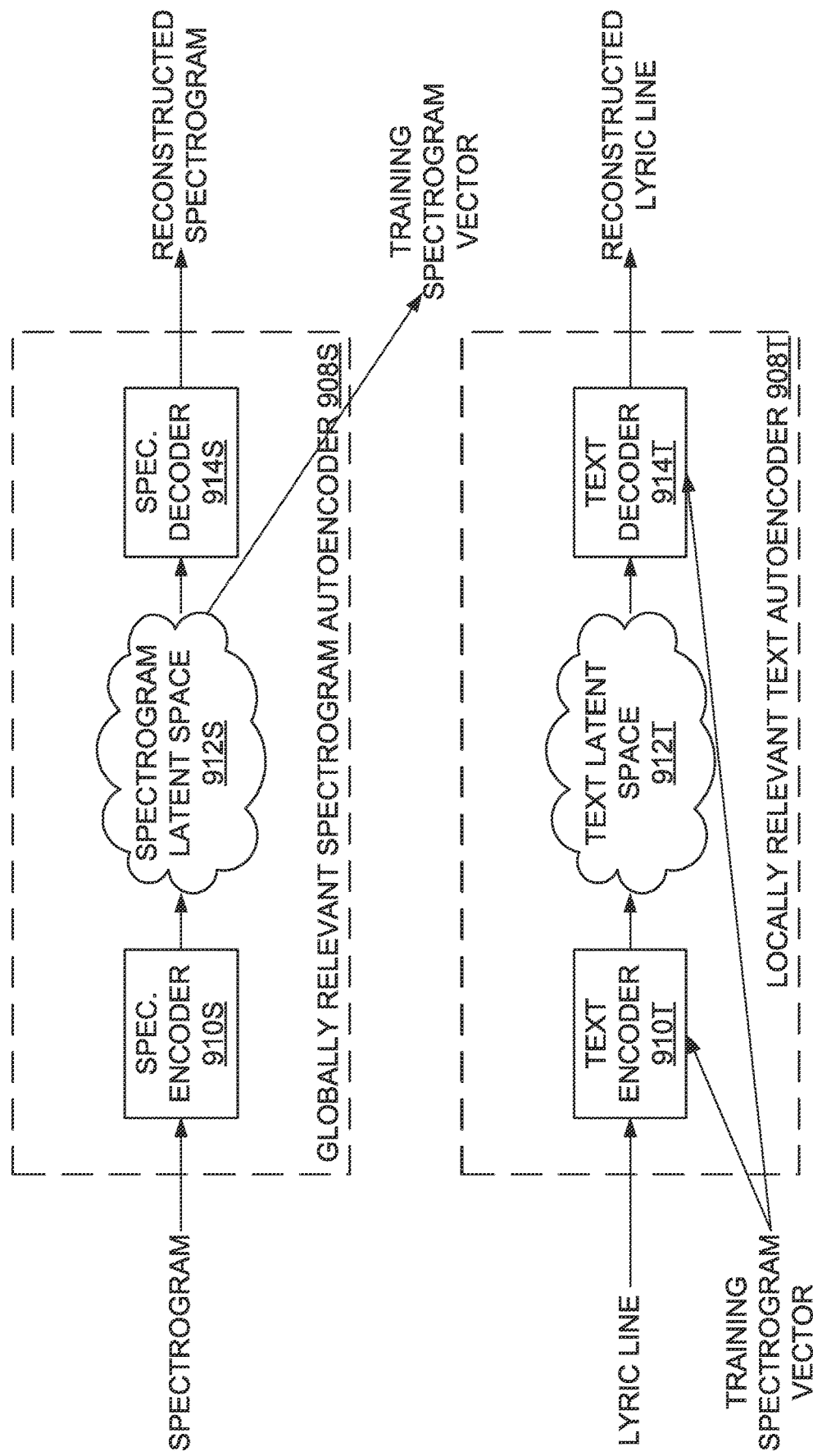
FIG. 9 illustrates a globally relevant spectrogram autoencoder and a globally relevant text variational autoencoder, in accordance with aspects of the present application.
Figure 10:
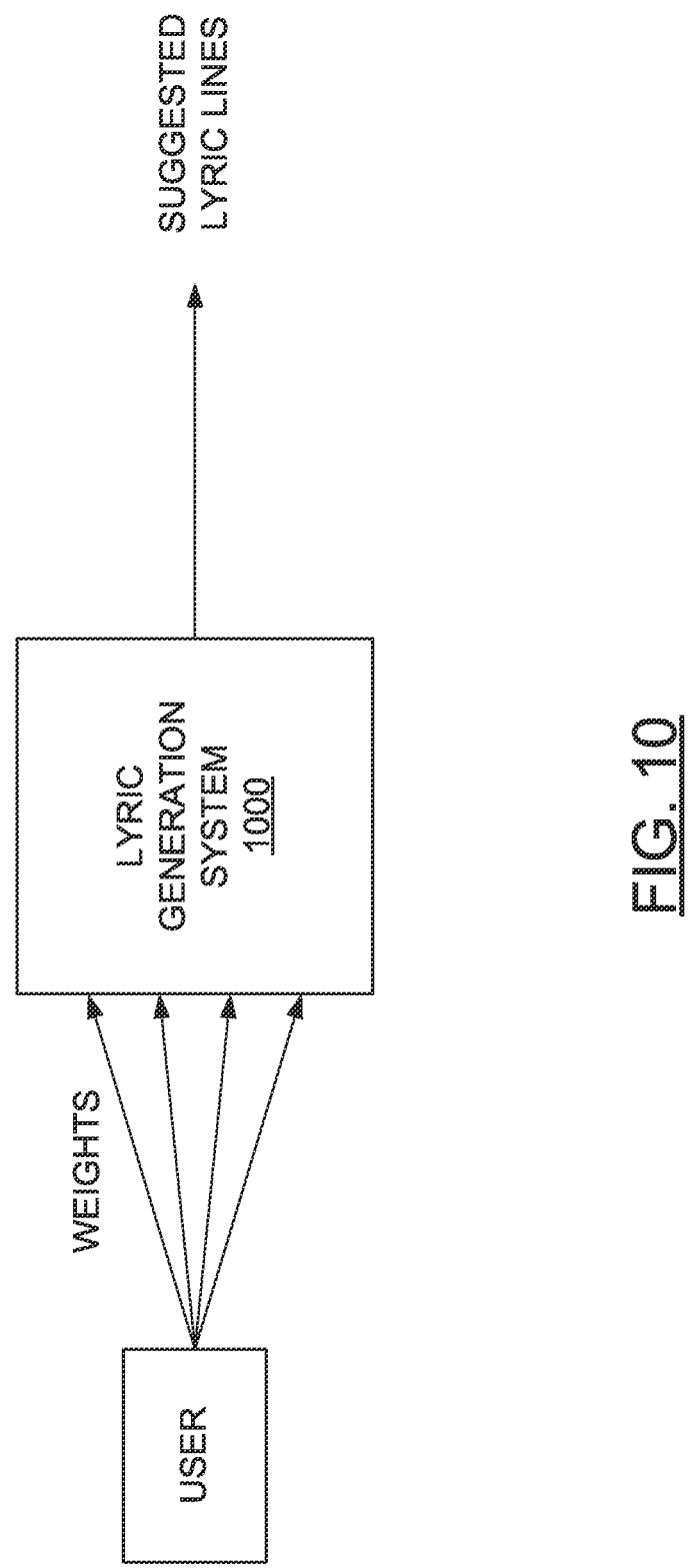
FIG. 10 illustrates a lyric generation system configured to implement the globally relevant spectrogram autoencoder and the globally relevant text variational autoencoder of FIG. 9.

FIG. 9 illustrates a globally relevant spectrogram autoencoder 908S and a locally relevant text variational autoencoder 908T. The globally relevant spectrogram autoencoder 908S may be variational or deterministic. FIG. 10 illustrates a lyric generation system 1000 configured to implement the globally relevant spectrogram autoencoder 908S and the locally relevant text variational autoencoder 908T of FIG. 9.

In common with the spectrogram variational autoencoder 208S of FIG. 2, the globally relevant spectrogram autoencoder 908S of FIG. 9 includes a spectrogram encoder 910S, a spectrogram latent space 912S and a spectrogram decoder 914S. In aspects of the present application, the spectrogram encoder 910S may be implemented as a convolutional neural network. In aspects of the present application, the spectrogram decoder 914S may be implemented as a convolutional neural network.

In common with the text variational autoencoder 208T of FIG. 2, the locally relevant text variational autoencoder 908T of FIG. 9 includes a text encoder 910T, a text latent space 912T and a text decoder 914T. In aspects of the present application, the text encoder 910T may be implemented as a long short term memory network. In aspects of the present application, the text decoder 914T may be implemented as a long short term memory network.

In a global training phase, a global training data set of spectrograms is used. Notably, the global training data set of spectrograms also includes corresponding lyrics. In the case wherein the globally relevant spectrogram autoencoder 908S is deterministic, the output of the spectrogram encoder 910S is a vector in the spectrogram latent space 912S. In the case wherein the globally relevant spectrogram autoencoder 908S is variational, the output of the spectrogram encoder 910S is a distribution in the spectrogram latent space 912S. In the following, the term vector will be used in places that may also use the term distribution. It should be understood that the term distribution should be substituted for the term vector in the case wherein the globally relevant spectrogram autoencoder 908S is variational.

In a local training phase, a user plays a piece of music in a first "style" or a first "mood." The terms "style" and "mood" may be used interchangeably. The spectrogram encoder 910S encodes an interval of the piece of music played by the user to generate a "new" spectrogram vector. The lyric generation system 1000 compares the new spectrogram vector to each of the spectrogram vectors in the spectrogram latent space 912S.

The comparing may, for example, involve determining a cosine distance between the new spectrogram vector and each of the spectrogram vectors in the spectrogram latent space 912S.

The lyric generation system 1000 selects, from among the spectrogram vectors, a set of n top-ranked spectrogram vectors that are "closest" to the new spectrogram vector (e.g., the selected vectors have the lowest cosine distance).

The encoding and comparing may be repeated for all of the intervals that make up the piece of music played by the user. For a three-and-a-half minute piece of music divided into 10 second intervals, there will be 21 intervals to be encoded and compared. For each of the 21 intervals, the lyric generation system 1000 may be understood to obtain n "closest" vectors from the set vectors in the spectrogram latent space 912S. The lyric generation system 1000 may then create a "pool" of spectrogram vectors (say, 6000). The creation of the pool may, for example, involve creating a union of all "closest" vectors for all 21 intervals and creating a single, ranked list. The creation of the single, ranked list may, for example, use a Rank Biased Overlap (RBO) measure. The lyric generation system 1000 may then then select a representative collection of top-ranked spectrogram vectors. These top-ranked vectors may be the vectors that have the highest cosine similarity to most of the 21 intervals.

The lyric generation system 1000 may then determine an average of all vectors in the collection of top-ranked vectors. The lyric generation system 1000 may then determine an average vector. The average vector may, going forward, be considered a "style" vector for association with the given three and a half minute piece of music.

The user may follow up the provision of the first piece of music with provision of further pieces of music in distinct styles. By repeating the encoding, comparing and selecting outlined hereinbefore, the lyric generation system 1000 may obtain a style vector to associate with each of the pieces and, consequently, the style vector is associated with the style of the music played by the user. If the first musical piece provided by the user was rock, the subsequent pieces can be blues, jazz and reggae. One of the benefits of the training phase is the obtaining of a plurality of style vectors. In the example presented, there are four style vectors including one style vector for each of rock, blues, jazz and reggae.

As discussed hereinbefore, the training phase for the globally relevant spectrogram autoencoder 908S involved selecting a representative collection of top-ranked spectrogram vectors. It is understood that each of the top-ranked spectrogram vectors is a result of encoding a spectrogram in the training set and that each of the spectrograms in the training set has a corresponding lyric line.

A training phase may be applied to the locally relevant text variational autoencoder 908T of FIG. 9. By using only the lyric lines in the training set that correspond to the top-ranked spectrogram vectors, the training phase for the locally relevant text variational autoencoder 908T conserves computing resources while making the result personal to the user. The locally relevant text variational autoencoder 908T may be trained as a conditional autoencoder, as discussed hereinbefore, by providing a training spectrogram vector to the text encoder 910T as part of an input vector. However, it should be clear that conditionality at the locally relevant text variational autoencoder 908T is not essential.

At inference time, illustrated, in FIG. 11, as example steps of a lyric generation method using the fifth approach illustrated in FIGS. 9 and 10, in accordance with aspects of the present application, input from the user does not include music. Instead, as illustrated in FIG. 10, the lyric generation system 1000 receives (step 1102) input from the user, where the input includes a plurality of weights. Notably, the weights may be normalized to sum to one. Each weight among the plurality of weights corresponds to a style vector among the plurality of style vectors that have been established in the local training phase. The lyric generation system 1000 may generate (step 1104), by weighting each style vector by the corresponding weight, an interpolated style vector. The lyric generation system 1000 may then obtain (step 1106) a text vector by sampling from a prior distribution in the text latent space 912T. The lyric generation system 1000 may then cause the text decoder 914T generate (step 1108) an output lyric line by decoding a text decoder input vector. The text decoder input vector may be based, at least in part, on the interpolated style vector generated in step 1104 and the text vector sampled in step 1106.

The text autoencoder 108, 208T, 408T, 708T, 908T in the approaches discussed hereinbefore may be conditioned to generate lyric lines conforming to requirements other than those requirements already discussed. For example, rhyme conditioning may be implemented, as outlined in the following.

One task related to rhyme conditioning relates to processing a dataset. Each lyric line in a training dataset of lyric lines may be converted into a phonetic transcription. Such a conversion may be accomplished using, for example, the known Carnegie Mellon University Pronouncing Dictionary. All syllables beginning from and including a last stressed syllable in a given lyric line may then be extracted. The extracted syllables may then be identified as a rhyming pattern for the given lyric line. Each lyric line in the training dataset may then be processed so the each lyric line may be labelled with a numerical index corresponding to the identified rhyming pattern.

Another task related to rhyme conditioning relates to training the model. For example purposes, consider that a dataset of 30,000 lyric lines has 2,000 rhyming patterns and each rhyming pattern is associated with a rhyming pattern embedding. The 2,000 rhyming pattern embeddings may be randomly initialized, as per usual practice. For example, randomly initializing the rhyming pattern embeddings may be accomplished by performing a random sampling of real numbers from a uniform distribution. The rhyming pattern embeddings may then be set to be trainable, as per a usual stochastic gradient descent training procedure, while training the text autoencoder. The text decoder input vector may be based, at least in part, on the representation obtained in step 302 and the text vector sampled in step 304 and the rhyming embedding corresponding to the rhyming pattern of the given lyric line.

Upon completion of rhyme conditioning, generating rhyming lyric lines may involve receiving, from a user, a rhyming pattern. For example, the user may provide a word or a text to rhyme with. A rhyming pattern may be extracted from the user-provided text. From the extracted rhyming pattern, an associated rhyming pattern embedding may be determined. Subsequently, the rhyming pattern embedding may be provided as input to the text decoder 114, 214T, 414T, 714T, 914T in addition to other decoder inputs described in in the approaches discussed hereinbefore. As a consequence of the training and the input, the text decoder 114, 214T, 414T, 714T, 914T may generate a lyric line that matches the specified rhyming pattern.

It should be appreciated that one or more steps of the embodiment methods provided herein may be performed by corresponding units or modules. For example, data may be transmitted by a transmitting unit or a transmitting module. Data may be received by a receiving unit or a receiving module. Data may be processed by a processing unit or a processing module. The respective units/modules may be hardware, software, or a combination thereof. For instance, one or more of the units/modules may be an integrated circuit, such as field programmable gate arrays (FPGAs) or application-specific integrated circuits (ASICs). It will be appreciated that where the modules are software, they may be retrieved by a processor, in whole or part as needed, individually or together for processing, in single or multiple instances as required, and that the modules themselves may include instructions for further deployment and instantiation.

Although a combination of features is shown in the illustrated embodiments, not all of them need to be combined to realize the benefits of various embodiments of this disclosure. In other words, a system or method designed according to an embodiment of this disclosure will not necessarily include all of the features shown in any one of the Figures or all of the portions schematically shown in the Figures. Moreover, selected features of one example embodiment may be combined with selected features of other example embodiments.

Although this disclosure has been described with reference to illustrative embodiments, this description is not intended to be construed in a limiting sense. Various modifications and combinations of the illustrative embodiments, as well as other embodiments of the disclosure, will be apparent to persons skilled in the art upon reference to the description. It is therefore intended that the appended claims encompass any such modifications or embodiments.

What is claimed is:

1. A method of generating lyrics, the method comprising:
obtaining, from an encoding portion of a first autoencoder, a representation of a time-limited audio recording;
sampling, from a second distribution, a text vector;
generating an output lyric line by decoding a text decoder input vector that is based, at least in part, on the representation and the text vector;
wherein the decoding uses a decoding portion of a second autoencoder, wherein the second autoencoder is a latent variable model autoencoder;
wherein the decoding portion of the second autoencoder has been trained to generate reconstructed output lyric lines based, at least in part, on input that includes:
a first latent vector from a latent space of the first autoencoder, the first autoencoder trained with spectrogram input of known musical works; and
a second latent vector sampled from a distribution in a latent space of the second autoencoder, the second autoencoder trained with lyric input of the known musical works corresponding to the spectrogram input of known musical works;
wherein the distribution in the latent space of the second autoencoder is encoded lyric input corresponding to a spectrogram input encoded to lead to the first latent vector.

2. The method of claim 1, wherein the first autoencoder comprises a variational autoencoder.

3. The method of claim 2, further comprising:
encoding the spectrogram to produce a first distribution; and
sampling, from the first distribution, the representation.

4. The method of claim 1, wherein the second autoencoder comprises a variational autoencoder.

5. The method of claim 1, wherein the second autoencoder comprises a Wasserstein autoencoder.

6. The method of claim 1, wherein the second autoencoder comprises an Adversarially Regularized autoencoder.

7. The method of claim 1, wherein the encoding portion of the first autoencoder comprises a convolutional neural network.

8. The method of claim 1, wherein the decoding portion of the second autoencoder comprises a long short term memory network.

9. The method of claim 1, wherein the decoding portion of the second autoencoder comprises gated recurrent units.

10. The method of claim 1, wherein the decoding portion of the second autoencoder comprises a transformer-based network.

11. The method of claim 1, wherein the second distribution comprises a prior text distribution.

12. The method of claim 1, wherein the second distribution comprises a posterior text distribution.

13. The method of claim 1, further comprising obtaining a spectrogram, wherein the spectrogram is representative of the time-limited audio recording.

14. A method of generating lyrics, the method comprising:
obtaining a spectrogram, where the spectrogram is representative of a time-limited audio recording;
encoding the spectrogram to, thereby, produce a first distribution, the encoding using an encoding portion of a first trained variational autoencoder;
sampling, from the first distribution, an inference spectrogram latent code;
generating, by providing the inference spectrogram latent code as input to a trained Generative Adversarial Network, an inference text latent code;
generating an output lyric line by decoding a text decoder input vector that is based, at least in part, on the inference spectrogram latent code and the inference text latent code;
wherein the decoding uses a decoding portion of a variational autoencoder;
wherein the variational autoencoder has been trained to generate reconstructed output lyric lines;
wherein training the variational autoencoder includes:
encoding a training spectrogram to, thereby, produce a training distribution, the encoding using the encoding portion of the first variational autoencoder;
sampling, from the training distribution, a training spectrogram latent code;
encoding a training input to, thereby, obtain a second distribution, the encoding using an encoding portion of the variational autoencoder, the training input including:
a lyric line corresponding to the training spectrogram; and
the training spectrogram latent code; and
sampling, from the second distribution, a training text latent code;
providing, as input to the decoder portion of the variational autoencoder, a training text decoder input vector that is based, at least in part, on the training spectrogram latent code and the training text latent code.

15. The method of claim 14, wherein the variational autoencoder comprises a conditional variational autoencoder.

16. A method of generating lyrics, the method comprising:
obtaining a spectrogram, where the spectrogram is representative of a time-limited audio recording;
encoding the spectrogram to, thereby, produce a first distribution, the encoding using an encoding portion of a first trained variational autoencoder;
sampling, from the first distribution, an inference spectrogram latent vector;
sampling, from a second distribution, an inference text latent vector, wherein a location, in a text latent space of a second trained conditional variational autoencoder, of the second distribution corresponds to a location, in a latent space of the first trained variational autoencoder, of the first distribution;

generating an output lyric line by decoding a text decoder input vector that is based, at least in part, on the inference spectrogram latent vector and the inference text latent vector;

wherein the decoding uses a decoding portion of the conditional variational autoencoder;

wherein the conditional variational autoencoder has been trained to generate reconstructed output lyric lines;

wherein training the conditional variational autoencoder includes:
- encoding a training spectrogram to, thereby, produce a training distribution, the encoding using the encoding portion of the first variational autoencoder;
- sampling, from the training distribution, a training spectrogram latent vector;
- encoding a training input to, thereby, obtain a second distribution, the encoding using an encoding portion of the conditional variational autoencoder, the training input including:
  - a lyric line corresponding to the training spectrogram; and
  - the training spectrogram latent vector; and
- sampling, from the second distribution, a training text latent vector;
- providing, as input to the decoder portion of the conditional variational autoencoder, a training text decoder input vector that is based, at least in part, on the training spectrogram latent vector and the training text latent vector.

17. The method of claim 1, further comprising:
receiving a plurality of known songs that include lyrics;
dividing each song of the plurality of known songs into a plurality of intervals;
training the first autoencoder to generate the representation from an input spectrogram derived from an interval among the plurality of intervals, wherein the training the first autoencoder causes generation of the latent space of the first autoencoder including a plurality of first distributions, where each first distribution in the plurality of first distributions corresponds to an interval among the plurality of intervals; and
training the second autoencoder to generate a reconstructed lyric line from an input lyric line derived from an interval among the plurality of intervals, wherein the training the second autoencoder causes generation of the latent space of the second autoencoder including a plurality of second distributions, where each second distribution in the plurality of second distributions corresponds to an interval among the plurality of intervals;
wherein, during the training the second variational autoencoder, a decoder portion of the second variational autoencoder is configured to generate the reconstructed lyric line based on input that includes:
- the first latent vector selected from a first distribution in the latent space of the first autoencoder, the first distribution corresponding to a given interval, and
- the text vector sampled from the second distribution in the latent space of the second autoencoder, the second distribution corresponding to the given interval.

18. The method of claim 1, further comprising:
receiving a plurality of known songs that include lyrics;
dividing each song of the plurality of known songs into a plurality of intervals;
training the first autoencoder to generate a reconstructed spectrogram from an input spectrogram derived from an interval among the plurality of intervals, wherein the training the first autoencoder causes generation of a first latent space including a plurality of first distributions, where each first distribution in the plurality of first distributions corresponds to an interval among the plurality of intervals; and
training the second autoencoder to generate a reconstructed lyric line from an input lyric line derived from a particular interval among the plurality of intervals in combination with a first latent vector sampled from a particular first distribution in the plurality of first distributions, wherein the particular first distribution corresponds to the particular interval and wherein the training the second autoencoder causes generation of a second latent space including a plurality of second distributions, where each second distribution in the plurality of second distributions corresponds to an interval among the plurality of intervals;
wherein, during the training the second variational autoencoder, a decoder portion of the second variational autoencoder is configured to generate the reconstructed lyric line based on input that includes the first latent vector and a second latent vector selected from a second distribution in the second latent space, the second distribution corresponding to the particular interval.

* * * * *